(12) United States Patent
Ueda

(10) Patent No.: US 6,656,291 B1
(45) Date of Patent: Dec. 2, 2003

(54) SOLDER PASTE AND SOLDERING METHOD OF THE SAME

(75) Inventor: Hidefumi Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/604,255

(22) Filed: Jun. 27, 2000

(30) Foreign Application Priority Data

Jun. 30, 1999 (JP) ............................................. 11-186569

(51) Int. Cl.⁷ ....................... B23K 35/363; B23K 35/365

(52) U.S. Cl. ................................................... 148/24

(58) Field of Search ................................. 148/25, 24

(56) References Cited

U.S. PATENT DOCUMENTS 4,216,035 A * 8/1980 Bakos et al. .................. 148/23
4,557,767 A * 12/1985 Hwang ......................... 148/23

FOREIGN PATENT DOCUMENTS

JP       8-090284       4/1996

* cited by examiner

*Primary Examiner*—Daniel J. Jenkins
(74) *Attorney, Agent, or Firm*—Staas & Halsey LLP

(57) ABSTRACT

A solder paste including a solder powder; and a flux including at least an activating agent, and acid anhydride obtained by a dehydration reaction of aliphatic carboxylic acid having up to seven carbon atoms. The solder paste provides excellent solderability, high corrosive resistance and a good shelf life, but not an offensive smell, during the soldering operation.

20 Claims, 2 Drawing Sheets

| | EXAMPLE | G | H | I | J | K | L | M | N |
|---|---|---|---|---|---|---|---|---|---|
| FLUX AND VEHICLE COMPOSITION | ROSIN | 50 | 50 | 50 | 50 | 50 | 50 | 50 | 50 |
| | MONOBUTYL CARBITOL | R | R | R | R | R | R | R | R |
| | HYDROGENATED CASTOR OIL | 3 | 3 | 3 | 3 | 3 | 3 | 3 | 3 |
| | DIETHYL AMINE-HCl | 0.6 | 0.6 | 0.6 | 0 | 0 | 0 | 0 | 0 |
| | TRIBUTYL AMINE-HBr | 0 | 0 | 0 | 0.8 | 0.8 | 0.8 | 0.8 | 0.8 |
| | DIETHYL AMINE | 2 | 2 | 2 | 0 | 0 | 0 | 0 | 0 |
| | TRIBUTYL AMINE | 0 | 0 | 0 | 3.5 | 3.5 | 3.5 | 3.5 | 3.5 |
| | ACETIC ACID | 0 | 0 | 0 | 0 | 0 | 0 | 0 | 0 |
| | PROPIONIC ACID | 0 | 0 | 0 | 0 | 0 | 0 | 0 | 0 |
| | BUTANOIC ACID | 0 | 0 | 0 | 0 | 0 | 0 | 0 | 0 |
| | ACETIC ANHYDRIDE | 1 | 0 | 0 | 1 | 0 | 0 | 2 | 3 |
| | PROPIONIC ANHYDRIDE | 0 | 1 | 0 | 0 | 1 | 0 | 0 | 0 |
| | BUTANOIC ANHYDRIDE | 0 | 0 | 1 | 0 | 0 | 1 | 0 | 0 |
| SOLDERABILITY (INITIAL) | | ○ | ○ | ○ | ○ | ○ | ○ | ◎ | ○ |
| SOLDERABILITY (AFTER STANDING) | | ○ | ○ | ○ | ○ | ○ | ○ | ◎ | ○ |
| PRESENCE OF AN OFFENSIVE SMELL | | × | × | × | × | × | × | × | × |
| SHELF LIFE | | ○ | ○ | ○ | ○ | ○ | ○ | ○ | ○ |

FIG. 1A

| EXAMPLE | | A | B | C | D | E | F |
|---|---|---|---|---|---|---|---|
| FLUX AND VEHICLE COMPOSITION | ROSIN | 50 | 50 | 50 | 50 | 50 | 50 |
| | MONOBUTYL CARBITOL | R | R | R | R | R | R |
| | HYDROGENATED CASTOR OIL | 3 | 3 | 3 | 3 | 3 | 3 |
| | DIETHYL AMINE-HCl | 0.6 | 0.6 | 0.6 | 0 | 0 | 0 |
| | TRIBUTYL AMINE-HBr | 0 | 0 | 0 | 0.8 | 0.8 | 0.8 |
| | DIETHYL AMINE | 2 | 2 | 2 | 0 | 0 | 0 |
| | TRIBUTYL AMINE | 0 | 0 | 0 | 3.5 | 3.5 | 3.5 |
| | ACETIC ACID | 1 | 0 | 0 | 1 | 0 | 0 |
| | PROPIONIC ACID | 0 | 1 | 0 | 0 | 1 | 0 |
| | BUTANOIC ACID | 0 | 0 | 1 | 0 | 0 | 1 |
| | ACETIC ANHYDRIDE | 0 | 0 | 0 | 0 | 0 | 0 |
| | PROPIONIC ANHYDRIDE | 0 | 0 | 0 | 0 | 0 | 0 |
| | BUTANOIC ANHYDRIDE | 0 | 0 | 0 | 0 | 0 | 0 |
| SOLDERABILITY (INITIAL) | | ◎ | ○ | ○ | ◎ | ○ | △ |
| SOLDERABILITY (AFTER STANDING) | | × | × | × | × | × | × |
| PRESENCE OF AN OFFENSIVE SMELL | | × | ○ | ○ | × | ○ | ○ |
| SHELF LIFE | | — | — | — | — | — | — |

FIG. 1B

| EXAMPLE | | G | H | I | J | K | L | M | N |
|---|---|---|---|---|---|---|---|---|---|
| FLUX AND VEHICLE COMPOSITION | ROSIN | 50 | 50 | 50 | 50 | 50 | 50 | 50 | 50 |
| | MONOBUTYL CARBITOL | R | R | R | R | R | R | R | R |
| | HYDROGENATED CASTOR OIL | 3 | 3 | 3 | 3 | 3 | 3 | 3 | 3 |
| | DIETHYL AMINE-HCl | 0.6 | 0.6 | 0.6 | 0 | 0 | 0 | 0 | 0 |
| | TRIBUTYL AMINE-HBr | 0 | 0 | 0 | 0.8 | 0.8 | 0.8 | 0.8 | 0.8 |
| | DIETHYL AMINE | 2 | 2 | 2 | 0 | 0 | 0 | 0 | 0 |
| | TRIBUTYL AMINE | 0 | 0 | 0 | 3.5 | 3.5 | 3.5 | 3.5 | 3.5 |
| | ACETIC ACID | 0 | 0 | 0 | 0 | 0 | 0 | 0 | 0 |
| | PROPIONIC ACID | 0 | 0 | 0 | 0 | 0 | 0 | 0 | 0 |
| | BUTANOIC ACID | 0 | 0 | 0 | 0 | 0 | 0 | 0 | 0 |
| | ACETIC ANHYDRIDE | 1 | 0 | 0 | 1 | 0 | 0 | 2 | 3 |
| | PROPIONIC ANHYDRIDE | 0 | 1 | 0 | 0 | 1 | 0 | 0 | 0 |
| | BUTANOIC ANHYDRIDE | 0 | 0 | 1 | 0 | 0 | 1 | 0 | 0 |
| SOLDERABILITY (INITIAL) | | ○ | ○ | ○ | ○ | ○ | ○ | ◎ | ○ |
| SOLDERABILITY (AFTER STANDING) | | ○ | ○ | ○ | ○ | ○ | ○ | ◎ | ○ |
| PRESENCE OF AN OFFENSIVE SMELL | | × | × | × | × | × | × | × | × |
| SHELF LIFE | | ○ | ○ | ○ | ○ | ○ | ○ | ○ | ○ |

SOLDER PASTE AND SOLDERING METHOD OF THE SAME

BACKGROUND OF THE INVENTION

1. Field of the Invention

The present invention relates to a solder paste and a soldering method of the solder paste, more particularly, to a soldering paste which is used in a circuit plate for electronic components or the like and a soldering method of the solder paste.

2. Description of the Related Art

In recently years, with development of compact size of an electronic appliance, a surface mounting technology has been becoming a main one for a mounting technology. This technology involves the steps of screen-printing a solder paste on a printed board, mounting a component and then reflowing the solder paste in a reflow furnace to form a circuit board.

The solder paste is a key technical element for the surface mounting technology. In order to solder the solder paste to a fine terminal with high reliability, a need exists for a solder paste which has high performance and high reliability.

It is well-known that when a junction metal (for example, an electrode of the electronic component) is soldered to another junction metal to be bonded (for example, an electrode of the printed board), it is necessary for the solder paste to have an solder alloy and solder flux. This solder flux can serve as (1) cleaning a surface of metal participating in a junction (removal of an oxide film), (2) re-oxidation preventing the cleaned metal surface, and (3) decreasing a surface tension of a fused solder.

The solder paste comprises a solder alloy (a solder powder) which is powdered to have a particle size of a few ten μm, and an organic component (that is to say, flux vehicle) which performs functions of providing a role as the flux and thixotropic properties to the solder paste. The performance to be required for the above solder paste involves solderability (wettability), printability and stability.

Properties of the solder powder and the flux vehicle play an important role on these abilities. For instance, the printability is highly dependent on the shape, the particle size and the particle size distribution of the solder powder, components of the flux, such as a solvent, a thixotropic agent and rosin of the flux vehicle, and mixing and tempering conditions for the solder powder and flux vehicle in making the solder paste.

Among the performances of the solder paste, since solderability has a significant influence on reliability of a connection portion between the circuit board and the components, this solderability dictates reliability of products. This solderability is strongly dependent upon a surface state and the particle size of the solder powder, flux vehicle components, in particular, rosin and a type and a content of an activating agent, or the like. Accordingly, up to the present, in order to improve solderability of the solder paste, it is normal to adjust the surface state and the particle size of the solder powder, flux vehicle components, in particular, rosin and the type and the content of the activating agent, or the like.

The activating agent acts directly on an oxide on a surface of the metal when heating is carried out during soldering operation, this agent has the function as the flux, this function of the activating agent being more excellent than that of only rosin. The activating agent is known to be hydrogen halide acid salts of amines, and organic acids. As the hydrogen halide acid salts of amine, in general, use is made of amine-HCl and amine-HBr. Activity of the hydrogen halide acid salts of amines is dependent on a molecular structure of amine.

However, in general, it is well-known that a rosin activated highly showing a high activity comprises amine-HCl and amine-HBr can be used as a slight amonut of the activating agent for a rosin activated midly. There is a good relationship between reliability and solubility of halide residues derived from hydrogen halide acid salts of amine against water. If these residues are not dissolved in water, there is no risk of corrosion.

On the other hand, the organic acids are typically used in a combination with a halogen salt of amine. The organic acids have the advantages that most organic acids exhibit an activating power from a low temperature at which an amount of the added halide can be inhibited, which results in low reliability of the products. The activating power of these organic acids is determined by acidity, that is, dissociation constant of acid. In general, the lower molecule has better acidity and shows the good activating power as the flux.

However, although the lower molecule has the large activating power as explained above, this molecule has a low melting point and it tends to volatilize upon making repeated use of the paste or upon allowing to stand for a waiting period from a screen-printing step to a soldering step. This may result in deterioration of soldering.

In addition, since the organic acid of the lower molecule is very reactive at room temperature, this organic acid which is contains in the solder paste may induce corrosion of the solder powder and may result in low shelf life of the solder paste. Moreover, because the organic acid of the reactive lower molecule has an offensive smell, there may be arisen problems that it is difficult to handle the solder paste containing the above compound.

By the way, recently, much attention has been paid to environmental problems and there has been a trend toward regulations against lead contained in the solder which is used for the electronic appliances. That is to say that development of "lead-free solder" have been made extensively.

As a development goal of the lead-free solder, this goal is to have the same properties as a conventional Sn—Pb eutectic solder which is a composite material and to have no load towards the environment. As a good candidate for the lead-free solder, there are Sn—Ag eutectic, Sn—Bi eutectic, and Sn—Zn eutectic systems or the like. There is developed a new alloy in which additional third and forth elements are added into each eutectic composition for the purpose of improving the properties, such as mechanical property and the melting point. However, any of alloys developed up to the present have some advantages and other disadvantages as the solder material, a solder paste having a high reliability has not been developed in the present time.

Speaking of solderability of this lead-free solder (concerning wettability, spreadability and capability of generating a solder ball), solderability of most Sn—Bi eutectic and Sn—Zn eutectic systems is inferior to that of Sn—Pb eutectic system, so that many problems are not settled as far as the former systems are concerned.

In order for the above Sn—Bi eutectic system to have effective solderability at low temperature, it is usual to add the activating agent which exhibits the activating power at low temperature into the solder paste. As the activating agent which has the activating power at low temperature, there may be used many low molecular organic acids having a carboxylic acid. However, when these low molecular organic acids are used as the activating agent, as stated above, there may be arisen many problems relating to deterioration of solderability due to volatilization of the organic acid and corrosion of the solder powder caused by high reactivity of the organic acid, low shelf life induced by the foregoing, low operational effectiveness by the bad odor of the organic acid.

SUMMARY OF THE INVENTION

Accordingly, it is a general object of the present invention is to provide a solder paste with which properties required for soldering can be improved.

A more specific object of the present invention is to provide a solder paste with which solderability, corrosive resistance and a shelf life can be ameliorated, and low operational effectiveness due to a bad odor of an organic acid can be improved.

The above objects of the present invention are achieved by a solder paste comprising: a solder powder; and a flux comprising at least an activating agent, and acid anhydride obtainable by a dehydration reaction of aliphatic carboxylic acid having up to seven carbon atoms.

The above-mentioned objects of the present invention can also be achieved by a solder paste comprising: a solder powder; and a flux containing at least an activating agent and acid anhydride having the following formula as shown below:

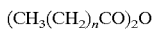

where n is a integer from 0 to 2.

Another object of the present invention is to provide a soldering method by use of a solder paste comprising: a solder powder; and a flux comprising at least an activating agent, and acid anhydride obtainable by a dehydration reaction of aliphatic carboxylic acid having up to seven carbon atoms.

The above object of the present invention is achieved by a soldering method comprising the step of: mixing a solder powder with a flux comprising at least an activating agent and acid anhydride obtainable by a dehydration reaction of aliphatic carboxylic acid having up to seven carbon atoms so as to form a solder paste; placing said solder paste in a predetermined position; and soldering a solder alloy with said solder paste, said solder alloy having a lower melting point thereof than that of Sn—Pb eutectic solder.

According to the present invention, there is provided a soldering method comprising the step of: mixing a solder powder with a flux comprising at least an activating agent and acid anhydride obtainable by a dehydration reaction of aliphatic carboxylic acid having up to seven carbon atoms so as to form a solder paste; placing said solder paste in a predetermined position; and soldering a solder alloy with said solder paste, said solder alloy comprising from 40 to 60 percent by weight of Sn and from 60 to 40 percent by weight of Bi.

An advantage of the present invention is the provision of a solder paste having excellent solderability, high corrosive resistance and high shelf life.

BRIEF DESCRIPTION OF THE DRAWINGS

Other objects, features and advantages of the present invention will become more apparent from the following detailed description when read in conjunction with the accompanying drawings, in which:

FIG. 1A illustrates results showing performances by use of conventional solder pastes, and FIG. 1B illustrates results showing performances by use of solder pastes according to the present invention.

DESCRIPTION OF THE PREFERRED EMBODIMENTS

It is found by the present inventor that it is preferable to add acid anhydride as an activating agent into a flux in order to enhance solderability of a solder paste. The inventor of the present invention has extensively investigated the problems of a conventional solder paste. As a result of the intensive study for effect of acid anhydride on solderability (wettability), it is discovered that acid anhydride exhibit the same high activity power as that of organic acids during soldering operation and acid anhydride is less volatile and corrosive than the organic acids.

The following will be given a description of reasons for the above excellent performances. Acid anhydride has a lower melting point than that of an organic acid formed by decomposition of the above acid anhydride. Thus, a solder paste comprising acid anhydride become stable without deteriorating its properties in storage (a temperature of 4 to 10° C.) and usage. In particular, examples of the above acid anhydrides include acetic anhydride, propionic anhydride and butanoic anhydride.

Accordingly, with the above property that acid anhydride has a lower melting point than that of the organic acid formed by decomposition of acid anhydride, the solder paste comprising acid anhydride is less volatile so that deterioration of solderability due to volatilization and low operational effectiveness induced by a bad smell can be inhibited. In addition, with the above property that a solder paste comprising acid anhydride become stable without deteriorating its properties in storage and usage, corrosion of the solder powder and low shelf life of the solder paste can be inhibited. That is to say, preservability of the solder paste can be enhanced.

Furthermore, when heating the solder paste during a soldering operation, lower molecular organic acids having a high activating power, for example, acetic acid, propionic acid and butanoic acid, can be produced by decomposition of the corresponding acid anhydrides. Each organic acid cleans a surface of a junction mother member covered with oxide or the like and a surface of the solder powder, and enhances a diffusion reaction between the solder and the junction mother member. Thus, as a consequence of the above, excellent solderability (wettability and spreadability) of the solder paste can be attained by use of acid anhydride.

From experiments conducted by the present inventor, in particular, when acetic anhydride is contained in the flux forming the solder paste in an amount of from 0.5 to 3.0 percent by weight, good properties can be obtained, for example, solderability and preservability of the solder paste, and inhibition of the offensive odor.

By containing amine in the flux in addition to acid anhydride, it is possible to control the performance of acid anhydride by a molecular structure of amine and an amine content. Thus, it can be realized that the solder paste is made according to a desired solderability.

When using a solder alloy having a lower melting point than that of Sn—Pb eutectic solder, the above acetic anhydride gives the lower molecular organic (e.g., acetic acid, propionic acid and butanoic acid) showing the activating powder upon heating at lower temperature during the soldering operation, so as to ensure that good soldering can be carried out. Accompanied by the above, it is possible to use the solder paste including acid anhydride for use in soldering a lead-free solder having a lower melting point. In the event of the above case using the lead-free solder, it is possible to use solder alloy including from 40 to 60 percent by weight of Sn and from 60 to 40 percent by weight of Bi.

The present invention will be illustrated in more detailed with reference to examples below, but these are not to be construed as limiting the invention.

EXAMPLES A TO N

In order to obtain performances of the solder paste according to the present invention, the following experiments were conducted.

Conditions of Experiments

Mixture of flux components as shown in FIGS. 1A and 1B was carried out to form a flux (i.e., flux vehicle). This flux was mixed with a solder powder (42Sn—58Bi, Non-oxide spherical powder, particle size of from 38 to 53 μm) to form a solder paste.

Figures as shown in FIG. 1A and FIG. 1B represent percent by weight of flux components. In addition, examples A to F of FIG. 1A was conducted by using conventional solder paste and examples G to N of FIG. 1B was done by use of the solder paste comprising acid anhydride according to the present invention. Acid anhydride used in examples G to N can be obtained by a hydration reaction of aliphatic carboxylic acid having up to seven carbon atoms.

More specifically, experiments according to the present invention was conducted by allowing the solder paste to stand under an atmosphere for maximum 8 hours after formation of the solder paste and by allowing the solder paste to stand under the atmosphere for maximum 8 hours after screen-printing the solder paste, test was carried out for solder wetting and spreading capability in conformity with JIS-Z-3284. With an estimate of solderablity by solder ball generating test, the presence of an offensive smell of the solder paste was judged during a surface mounting operation. In the estimate of the presence of the offensive smell, mark O represents none and mark x means that the offensive smell was observed during the soldering operation. Further, a shelf life was determined by solderability of the solder paste after storing the solder paste for 3 months at a temperature of 4° C. Mark O indicates good shelf life.

It should be noted that solderability (initial) as shown in FIGS. 1A and 1B represents an experimental result of solderability tested right after formation of the solder paste and solderability (after standing) represents an experimental result of solderability tested after being allowing to stand under the atmosphere. Moreover, in these FIGs, mark x means failure, mark O does good and mark ⊙ does excellent good.

In components of the flux vehicle, monobutyl carbitol serves as a solvent and a hydrogenated castor oil acts as a thixotropic agent. In FIGS. 1A and 1B, amounts of monobutyl carbitol was used in such a way that a total amount was 100 percent by weight. Mark R indicates a remaining percent by weight of monobutyl carbitol.

Experimental Results

In examples A to F, acetic acid, propionic acid and butanoic acid were used, which are the conventional activating agents. Examples A to F exhibited good solderability (initial), but examples A to F resulted in significant decrease in solderability when the solder pastes used in examples A to F was allowed to stand for 2 or 3 hours after screen-printing the solder paste. In addition, when using propionic acid and butanoic acid as the activating agent, the strongly offensive smell was generated during the soldering operation, thereby giving rise to problems relating to working effectiveness.

As comparing to examples A to F, in examples G to N where acid anhydrides (acetic anhydride, propionic anhydride and butanoic anhydride) were contained in the solder paste, good solderability (initial) and solderability (after standing) could be obtained. Further, the shelf life of examples G to N was equal to or more than 3 months, thus the solder paste used in examples G to N can be put into practical use. No offensive smell occurred during the soldering operation when using the solder pastes according to examples G to N.

More specifically, in example M where acetic anhydride in the solder paste was present in an amount of 2 percent by weight, excellent results of solderability(initial) and solderability(after standing) could be obtained, as can be seen from FIG. 1B.

The present invention is not limited to the specifically disclosed embodiments, and variations and modifications may be made without departing from scope of the present invention.

The present application is based on Japanese priority application No. 11-186569 filed on Jun. 30, 1999, the entire contents of which are hereby incorporated by reference.

What is claimed is:

1. A solder paste comprising:
   an Sn—Bi solder powder; and
   a flux having at least one activating agent, including acid anhydride obtained by a dehydration reaction of aliphatic carboxylic acid having up to seven carbon atoms, wherein said solder paste is used for soldering a solder alloy having a lower melting point than that of Sn—Pb eutectic solder.

2. A solder paste comprising:
   an Sn—Bi solder powder; and
   a flux containing at least one activating agent including acid anhydride having the following formula:

$(CH_3(CH_2)_nCO)_2O$ where n is an integer from 0 to 2.

3. The solder paste as claimed in claim 2, wherein said acid anhydride is acetic anhydride contained in said flux in an amount of from 0.5 to 3.0 percent by weight.

4. The solder paste as claimed in claim 2, wherein amine is further contained in said flux.

5. The solder paste as claimed in claim 3, wherein amine is further contained in said flux.

6. A soldering method comprising the steps of:
   mixing an Sn—Bi solder powder with a flux having at least one activating agent including acid anhydride obtained by a dehydration reaction of aliphatic carboxylic acid having up to seven carbon atoms so as to form a solder paste;
   choosing said acid anhydride to be acetic anhydride continued in said flux in an amount of from 0.5 to 3.0 percent by weight;
   placing said solder paste in a predetermined position; and
   soldering a solder alloy with said solder paste, said solder alloy having a lower melting point than Sn—Pb eutectic solder.

7. A soldering method comprising the steps of:

mixing an Sn—Bi solder powder with a flux having at least one activating agent including acid anhydride having the following formula:

$(CH_3(CH_2)_nCO)_2O$ where n is an integer from 0 to 2, so as to form a solder paste;

choosing said acid anhydride to be acetic anhydride contained in said flux in an amount of from 0.5 to 3.0 percent by weight;

placing said solder paste in a predetermined position, and soldering a solder alloy with said solder paste, said solder alloy having a lower melting point than Sn—Pb eutectic solder.

8. The soldering method as claimed in claimed 7, wherein amine is further contained in said flux.

9. A soldering method comprising the steps of:

mixing an Sn—Bi solder powder with a flux having at least one activating agent including acid anhydride obtained by a dehydration reaction of aliphatic carboxylic acid having up to seven carbon atoms so as to form a solder paste;

choosing said acid anhydride to be acetic anhydride contained in said flux in an amount of from 0.5 to 3.0 percent by weight;

placing said solder paste in a predetermined position; and soldering a solder alloy with said solder paste, said solder alloy including from 40 to 60 percent by weight of Sn and from 60 to 40 percent by weight of Bi.

10. A soldering method comprising the steps of:

mixing an Sn—Bi solder powder with a flux having at least one activating agent including acid anhydride obtained by a dehydration reaction of aliphatic carboxylic acid having the following formula:

$(CH_3(CH_2)_nCO)_2O$ where n is an integer from 0 to 2, so as to form a solder paste;

choosing said acid anhydride is acetic anhydride contained in said flux in an amount from 0.5 to 3.0 percent by weight;

placing said solder paste in a predetermined position; and soldering a solder alloy with said solder paste, said solder alloy including from 40 to 60 percent by weight of Sn and from 60 to 40 percent by weight of Bi.

11. The soldering method as claimed in claim 10, wherein amine is further contained in said flux.

12. The solder paste as claimed in claim 1, wherein the acid anhydride is at least one of acetic anhydride, proprionic anhydride and butanoic anhydride.

13. The solder paste as claimed in claim 2, wherein the acid anhydride is at least one of acetic anhydride, proprionic anhydride and butanoic anhydride.

14. The solder paste as claimed in claim 1, wherein amine is a part of the at least one activating agent.

15. The method as claimed in claim 6, wherein said mixing step further comprises adding, as part of the at least one activating agent, amine.

16. The method as claimed in claim 9, wherein said mixing step further comprises adding, as part of the at least one activating agent, amine.

17. A solder paste comprising:

a solder powder; and a flux having at least one activating agent, including acid anhydride obtained by a dehydration reaction of aliphatic carboxylic acid having up to seven carbon atoms, wherein said solder paste is used for soldering a solder alloy having a lower melting point than that of Sn—Pb eutectic solder, wherein said acid anhydride has the following formula:

$(CH_3(CH_2)_nCO)_2O$ where n is an integer from 0 to 2, and wherein said acetic anhydride is acetic anhydride and is contained in said flux in an amount of from 0.5 to 3.0 percent by weight.

18. A soldering method comprising the steps of:

mixing an Sn—Bi solder powder with a flux having at least one activating agent including acid anhydride to form a solder paste;

placing said solder paste in a predetermined position; and soldering a solder alloy with said solder paste, said solder alloy including from 40 to 60 percent by weight of Sn and from 60 to 40 percent by weight of Bi.

19. The method according to claim 18, wherein the amount of the acetic anhydride in the flux chosen to be 0.5 to 3.0 percent by weight.

20. The method according to claim 19, wherein the Sn—Bi solder powder is about 42% Sn and about 58% Bi.

* * * * *